United States Patent

Masuda et al.

[11] Patent Number: 5,306,214
[45] Date of Patent: Apr. 26, 1994

[54] CHAIN-TYPE POWER TRANSMISSION BELT

[75] Inventors: Takashi Masuda, Kobe; Hiromi Michikura, Akashi; Akira Kawaguchi, Kobe, all of Japan

[73] Assignee: Mitsuboshi Belting Ltd., Nagata, Japan

[21] Appl. No.: 949,430

[22] Filed: Sep. 22, 1992

[30] Foreign Application Priority Data

Sep. 25, 1991 [JP] Japan ................................. 3-86324

[51] Int. Cl.⁵ .............................................. F16G 5/18
[52] U.S. Cl. ..................................... 474/245; 403/134
[58] Field of Search ............... 474/242, 245, 206, 212, 474/213, 215, 216; 403/71, 76, 134

[56] References Cited

U.S. PATENT DOCUMENTS

| | | | |
|---|---|---|---|
| 4,798,567 | 1/1989 | Hoshiro et al. | 474/242 |
| 5,052,985 | 10/1991 | Masuda et al. | 474/245 |

FOREIGN PATENT DOCUMENTS 4-04054349 2/1992 Japan ................................. 474/245

OTHER PUBLICATIONS

Japanese Patent Abstract No. 63-219937 (A).
Japanese Patent Abstract No. 2-256940 (A).

Primary Examiner—Ramon S. Britts
Assistant Examiner—Roger J. Schoeppel
Attorney, Agent, or Firm—Wood, Phillips, VanSanten, Hoffman & Ertel

[57] ABSTRACT

A tip member for an exposed pin end on a chain-type power transmission belt. The tip member has a body defining a first surface to be engaged with a cooperating pulley and a pin-receiving opening in the body defined by a surface of the body. The body surface has a concave portion for guiding pivoting of the pin bearing against the concave surface portion, a tapered inlet portion for guiding a pin end into an operative position within the pin-receiving opening, and a transition portion at least partially between the concave surface portion and tapered inlet portion.

20 Claims, 2 Drawing Sheets

CHAIN-TYPE POWER TRANSMISSION BELT

BACKGROUND OF THE INVENTION

1. Field of the Invention

This invention relates to chain-type power transmission belts and, more particularly, to a connection between pulley-engaging tip members and pins which connect a plurality of link plates together to produce an endless, flexible belt configuration.

2. Background Art

It is known to use endless power transmission belts to operate infinitely variable speed changers in the automotive industry. Rubber V-belts, metal chain-type belts and metal belts have all been used for this purpose.

One known type of metal chain-type belt is defined by a plurality of link plates interconnected by pins to define an endless, articulated configuration. V-blocks are interposed between adjacent pins and have tapered surfaces for engagement with cooperating pulleys. Exemplary chain-type power transmission belts of this type are shown in Japanese Patent Application Laid-Open Publication Nos. 57-22442, 59-226729, and 59-226730.

In another known construction for a chain-type power transmission belt, link connecting pins project beyond the side surfaces of the outermost link plates and directly engage cooperating pulley surfaces. The pulleyengaging surfaces of the pins are tapered to conform to the inclination of the engaged pulley surfaces. Exemplary belts of this construction are disclosed in Japanese Utility Model Application Laid-Open Publication No 63-37846. Typically, this type of power transmission belt permits the use of a large diameter pin to provide the required pulley contacting area.

Another known construction for a chain-type power transmission belt is disclosed in Japanese Patent Application Laid-Open Publication No. 63-219937. In this structure, the link-connecting pins project from both sides of the belt. A freely movable tip member is attached to the pin portions that are exposed at the belt sides. The tip members define surfaces to drive and be driven by cooperating pulleys. Preferably, each tip member is connected to be universally movable relative to the pin end. As the tip members engage with and disengage from a pulley, they reorient to keep the pulley-engaging tip member surfaces in substantially facial engagement with the cooperating pulley surface.

This type of belt is desirable, and attempts are being made to commercialize the same, in high load environments. More particularly, the tip members are connected to the pins so as to be universally pivotable relative thereto within a prescribed angular range. As the belt initiates contact with, or separates from, a pulley surface with a high load applied to the belt, the longitudinal and lateral forces applied by the pulley to the tip members reorient the tip members, most commonly by rotation, to cause a facial contact between the tip members and pulley surfaces and thereby distribute impact forces over a substantial surface area.

The face-to-face contact between the pulley surface and tip members prevents noise generation that would otherwise occur with a more localized contact region between the belt and pulley as the tip members are driven against and separated from the pulleys in use. Also, because the tip members reorient, there is no skewing of the belt as might occur with misaligned tip members and pulley surfaces. This avoids the generation of unwanted system vibrations.

This relative movement between the tip members and pins, while accounting for a positive drive characteristic and minimizing noise generation, does introduce a wear problem between parts.

Typically, the tip member is constructed with a spherical opening for reception of a correspondingly configured head of a pin. A tapered surface, converging towards the spherical surface, guides the pin head into the spherical opening during assembly and also avoids interference between the tip member and pin as the tip member reorients. The tapered surface and spherical surface blend together at an edge having a restricted diameter that prevents withdrawal of the spherical head of the pin. It has been found that, over time, repeated pivoting of the tip member in use causes the pin to wear the edge at the juncture of the tapered and spherical surfaces. Excessive wear may allow the pin to fully separate from the tip member with obviously adverse consequences. Even before separation, there may be unwanted play between the pin and tip member due to wear.

SUMMARY OF THE INVENTION

The present invention is specifically directed to overcoming the above wear problem in a novel and simple manner.

More particularly, the present invention is directed to a tip member for an exposed pin end on a chain-type power transmission belt. The tip member has a body defining a first surface to be engaged with a cooperating pulley and a pin-receiving opening in the body defined by a surface of the body. The body surface has a concave portion for guiding pivoting of the pin bearing against the concave surface portion, a tapered inlet portion for guiding a pin end into an operative position within the in-receiving opening, and a transition portion at least partially between the concave surface portion and tapered inlet portion.

The transition surface portion permits an additional degree of wear on the body without allowing the tip member to escape from the pin. Consequently, the power transmission belt can be run for a longer time without failure.

In one form, the pin-receiving opening in the tip member has a central axis and the transition portion is substantially parallel to the central axis. Preferably, the transition portion is annular and straight as viewed in cross section through a plane parallel to the central axis.

In one form, the tapered inlet portion makes an angle of between 25 and 50 with respect to the central axis.

To further avoid wear between the tip member and pin, structure can be provided to communicate lubricant from externally of the body to within the pin-receiving opening.

The invention further contemplates the tip member in combination with a pin extending through a plurality of links on a chain-type power transmission belt. The pin has a spherical end having an outer surface with a first diameter.

In one form, the length of the transition portion of the body surface parallel to the central axis is between 5 and 27% of the first pin end diameter. The concave surface portion is preferably spherical and has a diameter that is 2.5 to 4% larger than the first pin end diameter.

Preferably, the diameter of the entire transition surface portion is less than the first pin diameter.

In one form, the body has a second surface facing oppositely to the first surface for engagement with a link on a chain-type power transmission belt. The first and second surfaces are, in one form, substantially planar and parallel to each other.

The invention further contemplates a chain-type power transmission belt having a plurality of link plates connected by pins to define a flexible endless belt with laterally spaced sides, and a tip member connected to an exposed pin end. The tip member has a pin-receiving opening therein defined by a surface having a concave portion for guiding pivoting movement of the pin end bearing against the concave surface portion and a transition portion spaced laterally inwardly from the concave surface portion. The transition portion is preferably straight as viewed in cross section through a plane perpendicular to the central axis.

DETAILED DESCRIPTION OF THE DRAWINGS

Figure 1:
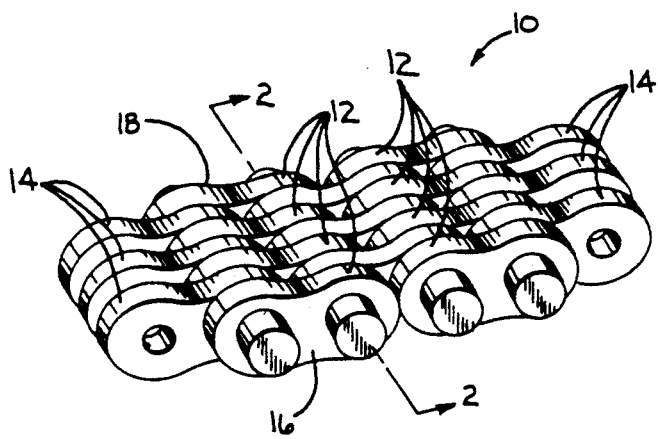
FIG. 1 is a fragmentary, perspective view of a chain-type power transmission belt with pulley-engaging tip members mounted thereon in accordance with the present invention.
Figure 2:
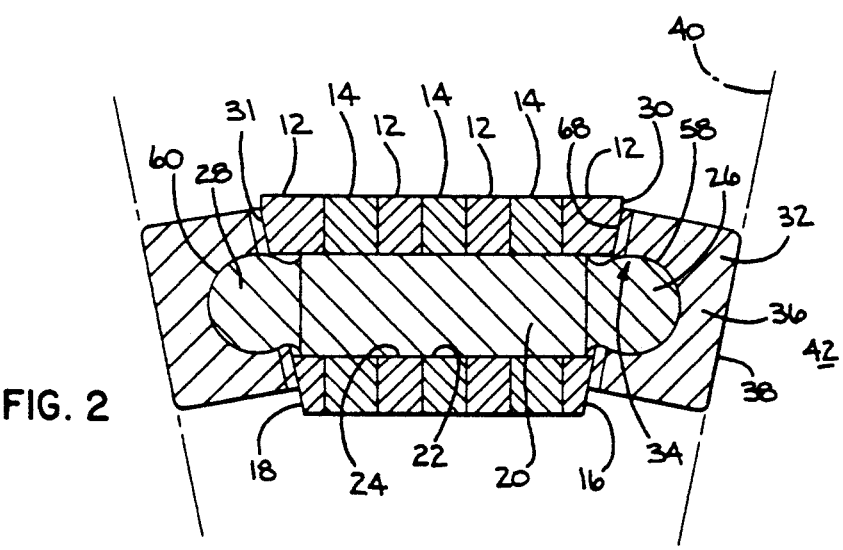
FIG. 2 is a cross-sectional view of the connection between the tip members and a pin taken along line 2—2 of FIG. 1.
Figure 3:
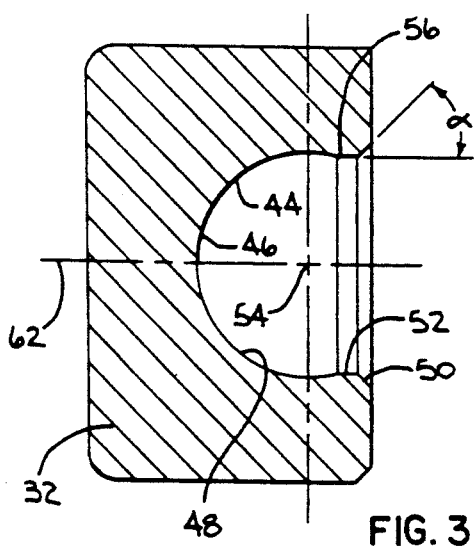
FIG. 3 is an enlarged, cross-sectional view of one of the tip members showing a pin-receiving opening therein.
Figure 4:
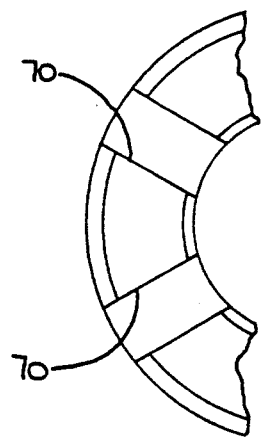
FIG. 4 is an enlarged, fragmentary, cross-sectional view of one of the tip members and showing means for communicating a lubricant to within the pin-receiving opening.

In FIGS. 1–6, a preferred form of chain-type power transmission belt, according to the present invention, is shown at 10. The belt 10 is defined by a plurality of main link plates 12 and sub-link plates 14. The plates 12, 14 have the same general configuration and, in the embodiment shown, have the outline of a figure "8". The main and sub-link plates 12, 14 alternate in a lateral direction between the spaced sides 16, 18 of the belt 10 and are staggered in a lengthwise direction. A plurality of laterally extending pins 20 extend through aligned openings 22, 24 in the plates 12, 14, respectively, to maintain the link plates 12, 14 together in a flexible, endless configuration.

Each pin 20 has opposite, spherical ends 26, 28 projecting laterally beyond the surfaces 30, 31 on the laterally outermost link plates 12 defining the belt sides 16, 18. A tip member 32 is attached to each pin end 26, 28. There are means 34 cooperating between the tip members 32 and pin ends 26, 28 for maintaining the tip members 32 in operative position on the pin ends 26, 28 in which position the tip members 32 are universally movable relative to the pin ends 26, 28.

The tip members 32 each have a body 36 defining a laterally outwardly facing surface 38 for facially engaging a surface 40 on a cooperating pulley 42 with the tip members 32 operatively connected to the pin ends 26, 28. While the tip members 32 are shown to be cylindrical in shape, other shapes are contemplated by the invention, to include conical shapes, truncated conical shapes, etc.

The means 34 for connecting the tip members 32 to the pins 20 includes a pin-receiving opening 44 in the body 36 of each tip member 32. The pin-receiving opening 44 is defined by a surface 46 on the body 36. The surface 46 has a concave portion 48, that is preferably spherical, a tapered portion 50, converging from right to left in FIG. 3 i.e. laterally outwardly of the body 32, and a transition portion 52 at least partially, and preferably wholly, between the concave and tapered portions 48, 50.

The center 54 of the concave portion 48 resides within the opening 44 to define a restricted, annular edge 56 at the juncture of the concave surface portion 48 and the transition portion 52. This edge 56 has a diameter that is less than the diameter of the spherical outer surfaces 58, 60 on the pin ends 26, 28, respectively. With the tip members 32 operatively connected to the pins 20, the spherical head surfaces 58, 60 bear against the concave surface portions 48 to allow guided, universal relative movement between the tip members 32 and pins 20.

The tapered surface portion 50 guides the pin ends 26, 28 into the pin-receiving openings 44 during assembly. In a preferred form, the tip members 32 are press fit on the pin ends 26, 28 by a shrinkage fitting technique. The spherical surface part 48 is selected to have a diameter that is 2.5 to 4% larger than the diameter of the pin end surfaces 58, 60. The tip members 32 are expanded by heating to 300° to 400° C. This causes expansion sufficient to allow entry of the pin ends 26, expansion sufficient to allow entry of the pin ends 26, 28 into the openings 44. In the absence of this expansion, press fitting of the pin ends 26, 28 into the tip members 32 may result in residual impressions made in the tip members 32 and/or pins 20. These impressions may cause abrasion or premature failure of the belt 10 over time. The press fit, absent heating, may also cause cracking of the pin 20 with the same detrimental results. A preferred angle α for the surface 50, relative to a central axis 62 for the opening 44, is 25° to 50°.

The present invention is concerned principally with the transition portion 52. The transition portion 52 is preferably straight, but may be slightly curved. It is also aligned either parallel to the central axis 62 or at a slight angle with respect thereto. Preferably, the entire length of the surface 52 has a diameter that is less than the diameter of the tip member surfaces 58, 60 to thereby prevent withdrawal of the pin ends 26, 28 from the pin-receiving opening 44 during operation.

Figure 5:
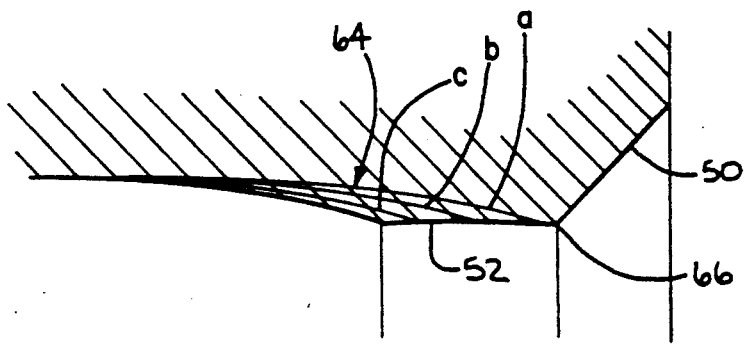
FIG. 5 is an enlarged, cross-sectional view of a portion of the tip member showing a pin-receiving opening according to the present invention.
Figure 6:
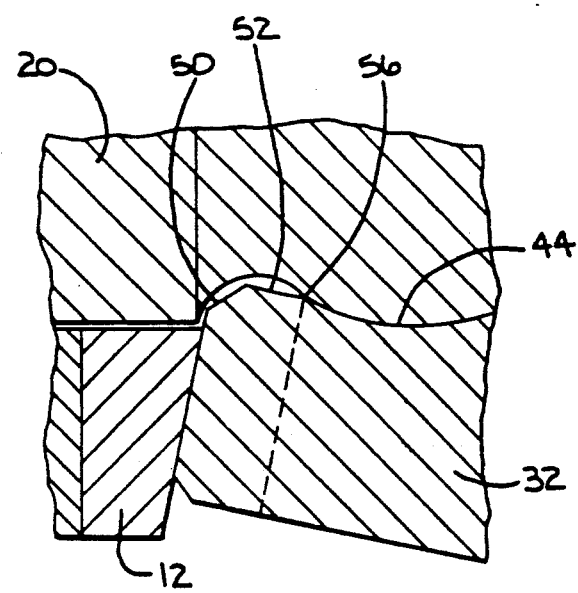
FIG. 6 is an enlarged, fragmentary, cross-sectional view of the inventive tip member operatively connected to a pin.

Through experimentation, it has been found that the length of the transition portion 52 parallel to the line 62 affects the internal abrasion curve for the tip member body as shown at 64 in FIG. 5. If the length of the transition portion 52 is excessively large, the abrasion curve penetrates deeply into the tip member body region in lateral alignment with the transition portion 52, as indicated by the lines a, b and c in FIG. 5. This results in considerable abrasive wear at the transition portion 52 which may ultimately progress to the point that the pin ends 26, 28 can escape from the tip members 32.

When the end of the abrasion curve reaches a point 66 at the juncture of the transition portion 52 and tapered portion 50, the holding force of the tip member 32 on the pin 20 diminishes to the point that the tip member 32 can disengage from the pin 20.

For optimum results, it has been found that the length of the transition portion 52 is preferably between 5 and 27% of the diameter of the pin surfaces 58, 60. If the length of the transition portion is less than 5%, the tip member 32 may slip off of the pin 20 even when the amount of abrasion is relatively small. If the length of the transition portion is greater than 27%, the juncture point 66 is situated closer to the pin surfaces 58, 60 so that wear is accelerated thereat and may cause premature disengagement of the tip member 32 from the pin 20.

With the tip members 32 operatively connected, an inside surface 68 of the body 36 facially engages the link plate surfaces 30, 31 to thereby maintain the desired orientation of the oppositely facing tip member surfaces 38. In a preferred form, the surfaces 68, 38 are substantially parallel to each other. With the arrangement in FIG. 2, the relative movement between the tip members 32 and pins 20 is primarily rotational about the axis 62.

The invention further contemplates a means for delivering lubricant from a point externally of the tip members 32 to within the pin-receiving opening 44. More particularly, this means includes a plurality of channels 70 extending radially through the tip members 32. A preferred method of construction of the tip members 32, to include the channels 70, is to form two such tip members 32 from a single blank. The blank has a cylindrical configuration and a length at least equal to two times the desired axial dimension of the tip members 32. The channels 70 are bored radially through the blank at circumferentially spaced locations centers at the same axial location. Thereafter, the blank is cut in half to expose one half of the bore defining the channels 70 on each half. The remainder of the pin-receiving opening 44 can then be machined in the separate halves. The tip members 32 are then heat treated, and subjected to nitrating treatment, boron treatment, or the like, to enhance surface hardness.

Preferably, the pins 20 are also subjected to austemper-hiboron composite treatment to enhance their resistance to abrasion.

With the present invention, even if abrasive wear occurs at the annular edge 56 on the body 36, the pin 20 will not separate from the tip member 32. The wear must progress along the entire length of the transition portion 52 before this separation can occur. Accordingly, the life of the tip member 32 is considerably lengthened over tip members in the prior art which do not have a corresponding transition portion 52.

Figure 7:
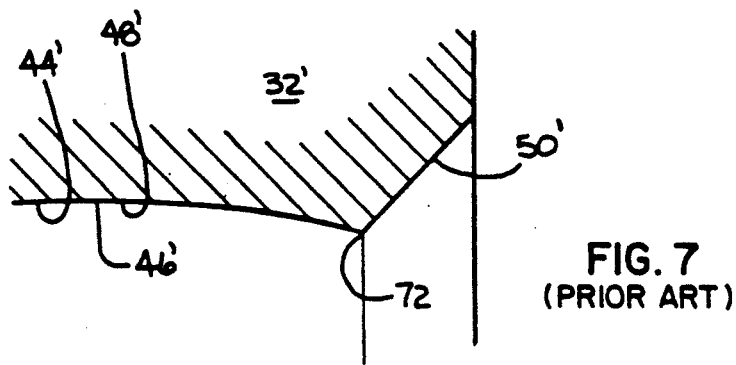
FIG. 7 is an enlarged, fragmentary, cross-sectional view of a pin-receiving opening on a prior art tip member.

The advantages of the present invention can be seen clearly viewing a prior art tip member 32' in FIG. 7. The tip member 32' has a pin-receiving opening 44' defined by a surface 46'. The surface 46' has a spherical portion 48' blending into a tapered portion 50' defining an opening for admitting a pin end. The juncture 72 between the surface portions 48', 50' has a diameter that is less than the diameter of a pin end accepted by the opening 44'. The corner at the juncture 72 is prone to wear during use. Because the point of juncture 72 is essentially a sharp edge, it is easily and rapidly worn. Even slight wear on the juncture point 72 may result in the release of the ends of a pin from the opening 44'.

The foregoing disclosure of specific embodiments is intended to be illustrative of the broad concepts comprehended by the invention.

We claim:

1. In a power transmission belt of the type having a length, laterally spaced sides and a pin with an end exposed at one of the laterally spaced sides, the improvement wherein a tip member is provided comprising:
   a body defining a first surface to be engaged with a cooperating pulley; and
   a pin-receiving opening in said body,
   said pin-receiving opening defined by a surface of said body,
   said body surface comprising a concave portion for guiding pivoting movement of the pin end bearing against the concave surface portion, a tapered inlet portion for guiding the pin end into an operative position within the pin-receiving opening, and a transition portion of a different configuration extending for a finite length between the concave surface portion and tapered inlet portion.

2. The improved power transmission belt according to claim 1 wherein the pin-receiving opening has a central axis and the transition portion is substantially parallel to the central axis.

3. The improved power transmission belt according to claim 2 wherein the transition portion is annular and the transition portion is straight as viewed in cross section through a plane parallel to the central axis.

4. The improved power transmission belt according to claim 1 including a means on the body for communicating a lubricant from externally of the body to within the pin-receiving opening.

5. The improved power transmission belt according to claim 2 wherein the tapered inlet portion makes an angle of between 25° and 50° with respect to the central axis.

6. The improved power transmission belt according to claim 2 wherein the power transmission belt includes a plurality of links through which the pin extends, said pin having a spherical end having an outer surface with a first diameter, and the length of the transition portion of the body surface parallel to the central axis is between 5 and 27% of the first diameter.

7. The improved power transmission according to claim 6 wherein the concave surface portion is a spherical surface portion and the diameter of the spherical surface portion is 2.5 to 4% larger than the first diameter.

8. The improved power transmission according to claim 6 wherein the diameter of the entire transition surface portion is less than the first quarter.

9. The improved power transmission according to claim 1 wherein said body has a second surface facing oppositely to said first surface.

10. The improved power transmission according to claim 9 wherein the first and second surfaces are substantially planar and parallel to each other.

11. The improved power transmission according to claim 1 wherein said transition portion is substantially linear as viewed in cross section through a plane parallel to the central axis.

12. A chain-type power transmission belt comprising:
   a plurality of link plates;
   a plurality of pins extending through the link plates to connect the link plates so as to define a flexible endless belt having laterally spaced sides, there being at least one said pin having an end exposed at one of the sides of the belt;

a tip member having a body; and means for connecting the tip member to the exposed end of the one pin, said means including a pin-receiving opening in the body, said pin-receiving opening having a central axis and defined by a surface of said body, said body surface comprising a concave portion for guiding pivoting movement of the pin end bearing against the concave portion and a transition portion of a different configuration extending for a finite length from said concave portion, said transition portion being straight as viewed in cross section through a plane perpendicular to the central axis.

13. The chain-type power transmission belt according to claim 12 wherein said body surface includes a tapered inlet portion and the transition portion is between the concave portion and tapered inlet portion.

14. The chain-type power transmission belt according to claim 13 wherein the tapered inlet portion makes an angle of between 25° and 50° with respect to the central axis.

15. The chain-type power transmission belt according to claim 12 wherein the concave surface portion is a spherical surface portion and the diameter of the spherical surface portion is 2.5 to 4% larger than the first diameter.

16. The chain-type power transmission belt according to claim 15 wherein the diameter of the entire transition surface portion is less than the first diameter.

17. The chain-type power transmission belt according to claim 12 wherein said body has a first substantially flat surface to be engaged by a pulley cooperating with the power transmission belt and the first surface makes substantially a right angle with the central axis.

18. The chain-type power transmission belt according to claim 17 wherein the body has a second surface facing oppositely to said first surface for engagement with one of the links.

19. The chain-type power transmission belt according to claim 18 wherein the first and second surfaces are substantially planar and parallel to each other.

20. The chain-type power transmission belt according to claim 12 including means on the body for communicating a lubricant from externally of the body to within the pin-receiving opening.

* * * * *